Dec. 30, 1952     H. STRASSER     2,623,258
MACHINE FOR THE MANUFACTURE OF POTTERY ARTICLES
Filed Aug. 16, 1951     4 Sheets-Sheet 1

Inventor
Hans Strasser

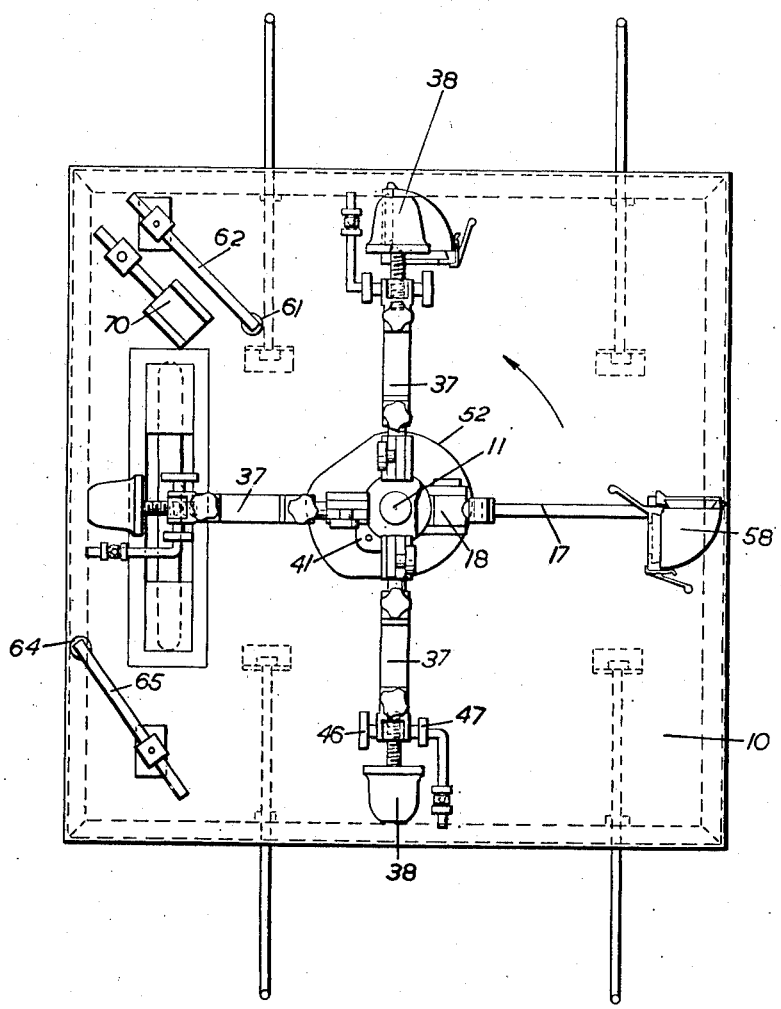

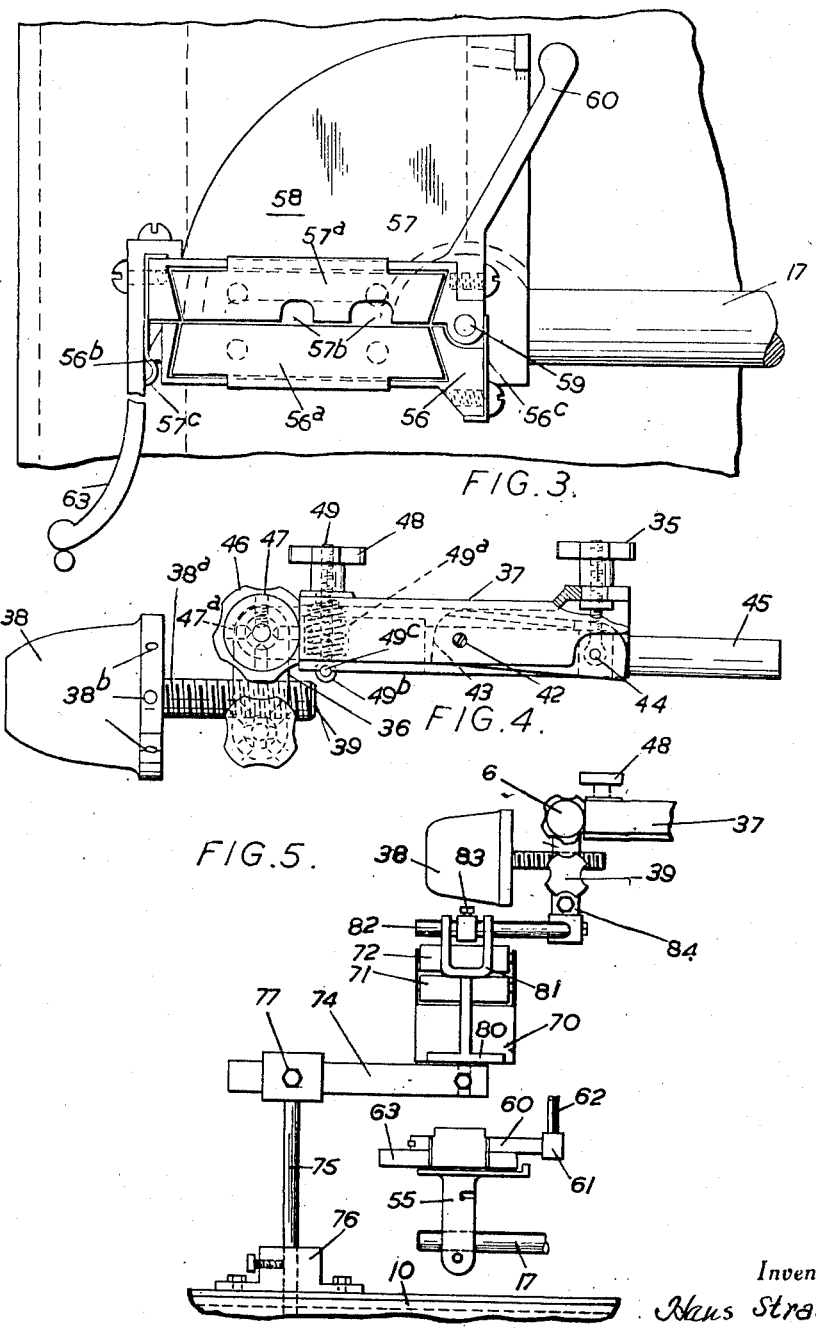

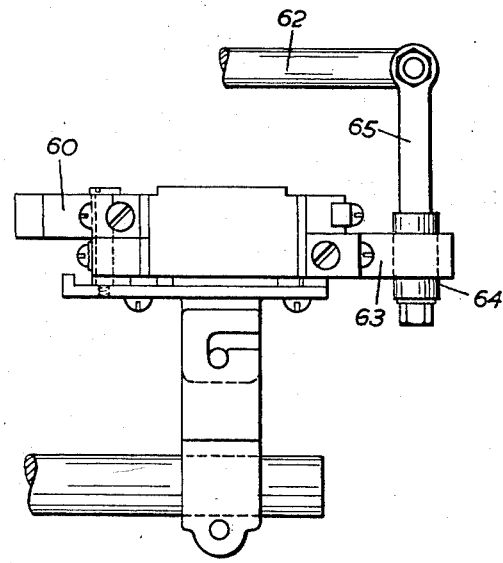
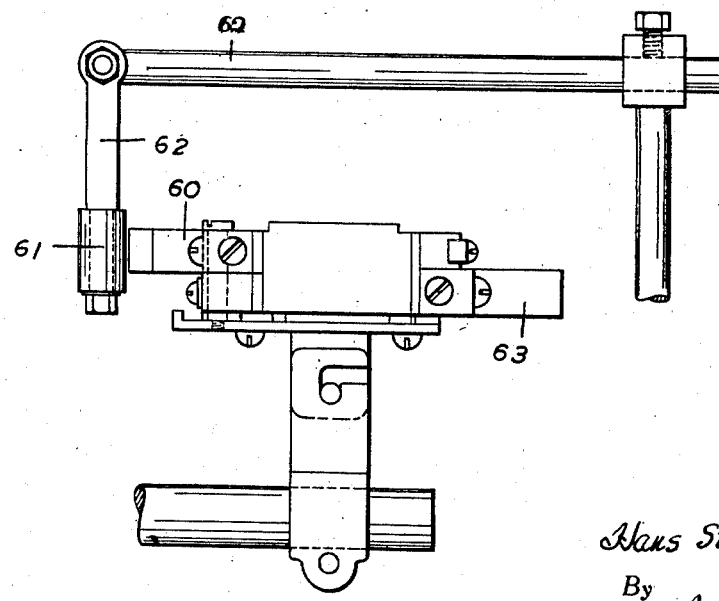

Patented Dec. 30, 1952

2,623,258

UNITED STATES PATENT OFFICE 2,623,258

MACHINE FOR THE MANUFACTURE OF POTTERY ARTICLES

Hans Strasser, Stoke-on-Trent, England

Application August 16, 1951, Serial No. 242,079
In Great Britain January 4, 1951

6 Claims. (Cl. 25—22)

This invention relates to the fixing of handles or other appendages to pottery articles, for example cups.

In my prior American Patent specification No. 2,537,922 there is described and claimed a machine comprising a drive spindle, a cradle for holding the appendage pivotally supported by the spindle for movement therewith, a chuck for holding the pottery article supported by the spindle for movement therewith in spaced relationship to the cradle, means to rotate the spindle whereby the cradle and chuck will move simultaneously through a predetermined path, and cam means disposed concentrically with respect to the axis of rotation of said cradle and in the path of movement of said cradle, whereby movement of the cradle toward the high point of the cam means moves the cradle about its pivot toward the chuck so that the appendage and pottery article are brought together and movement of the cradle toward the low point of the cam means moves the cradle about its pivot away from the chuck to leave the appendage adhering to the article. The machine also included a table with the drive spindle vertically disposed and journalled in the table; there were radially extending arms secured to the spindle, with an extension pivoted to the free end of each arm, a cradle being supported by each extension, each cradle being adapted to contain an appendage; there were also a corresponding number of radially extending arms secured to the spindle at a point above the first-mentioned arms, a chuck or support for the pottery article being carried by the free end of each of the last-named arms. The action of the cam was therefore to raise the cradles towards the chucks to bring together the appendages and the pottery articles and then to move the cradles away from the chucks leaving the appendages adhering to the articles. Provision was also made for adjusting the positions of the chucks and the cradles relative to each other.

The present invention has for its object to provide an improved form of machine on similar lines to the machine described in the prior patent.

In particular the object of the present invention is to provide a machine retaining the main features of the machine described in the prior patent but which will be more positive and precise in its operation and will be capable of dealing with appendages of a highly fragile and easily distorted nature.

Another object of the invention is to provide an improved form of cradle for holding the appendages and presenting them to the articles.

Another object is to provide an improved method of mounting the chucks for a fuller and more accurate range of adjustments.

Another object is to provide for the automatic supply of the slip or other adhesive by which the appendages are made to adhere to the articles.

The invention will be described with reference to the accompanying drawings in which:

Figure 2 is a plan.

Figures 3, 4, 5, 6 and 7 are detail views to be hereinafter referred to.

Figure 1:
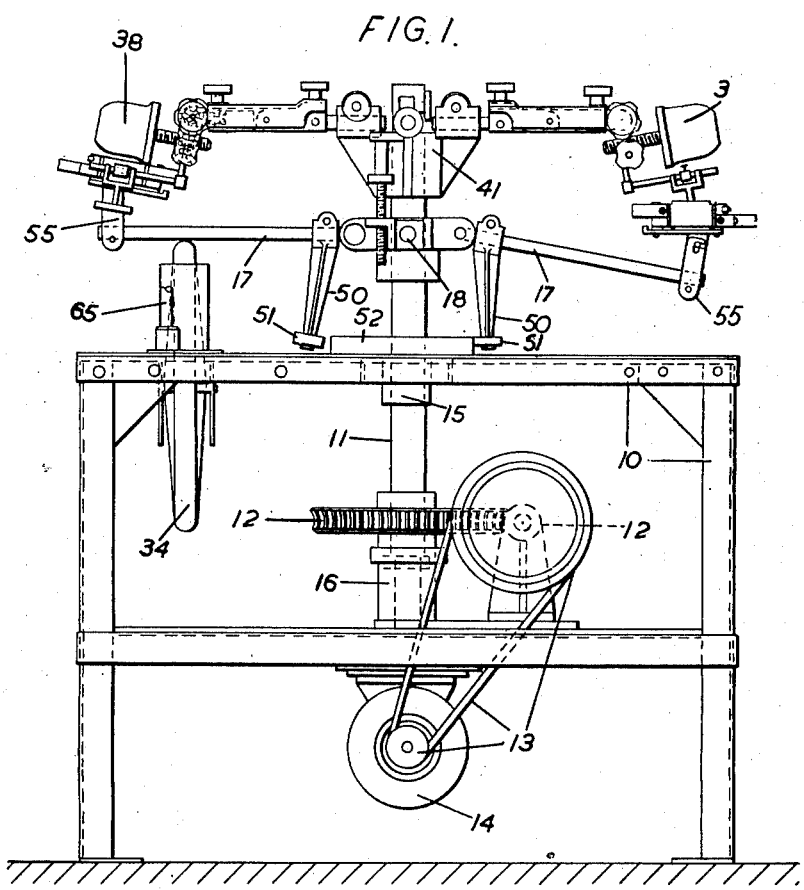
Figure 1 is a side elevation of a complete machine, designed for attaching clay handles to pottery cups.

A bench or frame 10 is provided, having mounted in it a central vertical shaft 11 driven by worm reduction gearing 12 and a belt and pulleys 13 from an electric motor 14. The shaft is journalled in bearings 15, 16. Above the bench top it has fixed to it a boss or collar 18, to which are pivotally connected four (or any other suitable number) of arms 17 which extend radially from the boss or collar and can be adjusted as to height by moving the boss or collar 18 up or down the shaft 11 and fixing it by a set screw. The arms have attached to them levers 50, and the free or lower end of each lever 50 carries a roller 51. As the shaft 11 rotates the rollers 51 ride round the periphery of a cam 52 fixed to the bench top, the cam being concentrically disposed with respect to the axis of rotation. As the shaft 11 rotates the rollers 51 successively reach a peak on the cam 52, as can be seen in Figure 2, at the left hand side, and this peak acts to lift the arms 17 successively up to an approximately horizontal position as can be seen in Figure 1, at the left hand side. Each arm 17 carries at its outer end a bracket 55 carrying a cradle member in which the handles are supported, the details of the cradle being shown in Figure 3. It comprises a pair of housings 56, 57, one of which is fixed on a suitable base or platform 58 while the other is hingedly mounted on a suitable pivot 59. Each housing is formed dovetailed to accommodate a correspondingly shaped block of rubber or the like, 56ª, 57ª, the blocks being slid into position in the dovetails from the top so that they cannot be displaced horizontally. The fixed block 56ª has a plain face where it adjoins the hinged block but the corresponding face of the hinged block has a recess 57ᵇ defining the handle or the like to be inserted in it. Spring clips are provided, one 57ᶜ on the hinged housing engaging with a lug 56ᵇ on the fixed housing to hold the two closed together, and one on the fixed housing shown at 56c co-operating with the hinge 59 and the movable housing to hold the movable housing in the required open or closed position. The movable housing may move on guide rails or runners on the base or platform to ensure smooth action. It carries a pair of extension pieces which as the cradles are moved into and out of the handle attaching zone of travel are acted upon by striker rollers. These are shown in detail in Figures 6 and 7. The extension 60 is acted on by a striker 61 carried by a bracket 62. The action forces the movable housing into the closed position where it is retained by the spring clips. The extension 63 is acted on by a striker 64 carried by a bracket 65. The action of this striker re-opens the movable housing after the handle or the like has been applied to the cup or the like. When it is desired to change over from one shaped handle to another it is merely necessary to slide the rubber block 57a out of its dovetail in the movable housing 57 and replace it by another of the desired pattern. The block 56a is not affected. On the shaft 11 at a higher level than the boss or collar 18 there is mounted another boss or collar 41, also adjustable as to height on the shaft, and this boss or collar carries arms, corresponding in number to the arms 17 which carry the cradles, these further arms serving to support the chucks 38 on which the cups or the like are carried. The arms are seen more especially in Figure 4. Each chuck 38 is mounted on a spindle 38a which is screwed into a split bracket 36, and the chuck can be adjusted axially by screwing it into or out of the split bracket 36 by making use of the tommy holes 38b on the chuck; the chuck can be locked in the desired position axially by means of the locking screw 39 which tightens up the split bracket. By unlocking and screwing it out of the split bracket 36 the chuck can also be replaced by another of the desired shape. This split bracket is fitted between the flanges of an inverted channel member 37 which is pivoted at 44 to the main arm 45 which is carried by the boss or collar 41. The bracket 36 can be swivelled in the member 37 by means of a hand wheel 46 and can be locked at the desired angle by a locking wheel 47 having tommy holes 47a. In this way the position of the chuck can be roughly determined, and is then adjusted by an adjusting nut 48 working on a pin 49 against the action or with the assistance of a spring 49a, the lower end of the pin having an eyelet 49b fitted about a peg 49c. The action of the nut 48 raises and lowers the channel member 37 on the pivot 49c and so alters the angle of the chuck holder or bracket 36. A still finer adjustment, chiefly to vary the amount of pressure which the handle will make against the side of the cup, is effected by raising and lowering the arm 43 in the end of the member 37 and this is achieved by means of the adjusting nut 35, working on a pin and eyelet arrangement 44, by which a very small movement is transmitted to the member 37 by way of the pivot 42. Finally a special adjustment of the chuck, exactly parallel to the cradle can be achieved by turning the adjustment nuts 48 and 35 simultaneously. As the cradles are carried round towards the attachment position it is desirable to provide mechanical means for applying slip to the cups or the like, so that when the handles are brought into contact they will adhere. This is achieved by means of a slip tank 70 mounted on the bench top, provided with rollers 71, 72 at different levels, one at each end. The chuck holder brackets 36 each carry a slip applying device, see especially Figure 5, which consists of a pad or the like shaped and proportioned to suit the particular handles being dealt with, for example the pad will apply two spots of slip in the case of open handles or a strip of slip in the case of block handles. The pads are carried by holders 80 attached to cranks 81 fitted to brackets 82 by a collar and set screw 83, adjustably located in or attached to the brackets 36, by means of extensions 84. As each slip applier comes round to the region of the slip tank 70 it is operated so that its pad receives a coating of slip by sliding over the roller 71 into the slip tank 70, from which it is lifted out by the roller 72 and at the same time presses lightly against the cup carried by the chuck 38, depositing on the cup a sufficient amount of slip for the handle to adhere to it. The crank 81 falls away again and the cam 52 raises the arm 17 and so the handle is lifted into contact with the cup, where slip has previously been applied, the handle cradle 56, 57 having already been closed so that the handle is firmly but lightly gripped between the rubber holders 56a, 57a. The actual pressure of the handle against the side wall of the cup is achieved by the pneumatic pressure of a pneumatic tired wheel 34 revolvably mounted in the frame so that it projects into the path of the arms 17 and raises them a little further than they would normally be raised by the cam 52. The handle having been applied to the cup the handle cradle is re-opened, the fixed handle remaining on the plain-shaped side of the split cradle, and the cup with the handle attached is removed from the chuck. The slip tank is adjustable horizontally on a bracket 74 and vertically by means of a column 75 carrying the bracket 74, the column being locked at the required height in the bench top by a set screw 76 and the bracket being adjusted relative to the column and locked by the set screw 77. These adjustments relate mainly to the roller 72, swinging the holder 80 into engagement with the surface of the cup, depositing on it slip in the correct places for the handle.

I claim:

1. In a machine for fixing appendages to pottery articles, a table, a vertical spindle journalled in said table, means for rotating the spindle, radially extending supports secured to said spindle, a pair of co-operating members adapted to function as a cradle and embrace the appendage therebetween, means engaging said co-operating members to close them together so that they hold the appendage firmly, further radially extending supports secured to said spindle at a level above the first mentioned supports, a support device for a pottery article carried by each of said second-mentioned radially extending supports, a cam concentrically disposed around said spindle and operatively associated with the first mentioned supports, said cam acting to move the cradles into register with the pottery articles and present the appendages to the surfaces of the articles, and means engaging said co-operating members of the cradles to open them out again after the appendage contained has been presented to the article.

2. In a machine as claimed in claim 1, cradles having two housings, a resilient block detachably located in each housing, the blocks being formed to accommodate an appendage therebetween, extension devices on one of the housings, a hinged connection between the two housings, means for holding the housings closed together so that an appendage is firmly held between them, means engaging one of the extensions to open out the housings about their hinge, and means engaging the other of the extensions to close them together again.

3. In a machine as claimed in claim 2 the provision of a container for liquid adhesive, an applier device carried by each of the pottery article support devices, means acting on the applier devices to charge them with the liquid, and means acting on the applier devices to move them into engagement with the surface of the pottery articles so that a deposit of the liquid takes place in register with the position where the appendage is to be presented.

4. In a machine as claimed in claim 3 a container for liquid adhesive having two surfaces one at each side, one higher than the other, the applier devices being arranged to ride successively over the lower surface, then to dip into the liquid and receive a charge thereof, and then to ride over the higher surface and thereby be moved into contact with the surface of one of the pottery articles.

5. In a machine as claimed in claim 1 in which said support devices each consists of a chuck, a screwed spindle attached to said chuck, a split bracket in which said spindle is adjustably located, a locking device for tightening up the bracket when the spindle is correctly set, and means for adjusting the angle at which the bracket is supported.

6. In a machine as claimed in claim 5 a member carrying the bracket, a further member, a pivotal connection between the member and the further member, a pivotal connection between the further member and the second mentioned radially extending support on the vertically journalled spindle, and adjusting and locking means acting on the said members to alter their angles relative to the radially extending supports so as to vary the setting of the chuck.

HANS STRASSER.

REFERENCES CITED

The following references are of record in the file of this patent:

UNITED STATES PATENTS

| Number | Name | Date |
| --- | --- | --- |
| 2,416,636 | Miller | Feb. 25, 1947 |
| 2,537,922 | Strasser | Jan. 9, 1951 |
| 2,560,007 | Steele | July 10, 1951 |